United States Patent [19]

Hayard

[11] Patent Number: 4,764,668
[45] Date of Patent: Aug. 16, 1988

[54] SYSTEM FOR LOCATING AN OBJECT PROVIDED WITH AT LEAST ONE PASSIVE TARGET PATTERN

[75] Inventor: Michel Hayard, Toulouse, France
[73] Assignee: Alcatel Espace, Courbevoie, France
[21] Appl. No.: 934,878
[22] Filed: Nov. 25, 1986
[30] Foreign Application Priority Data

Nov. 27, 1985 [FR] France .............................. 85 17521

[51] Int. Cl.$^4$ .............................................. G06K 7/10
[52] U.S. Cl. .................................... 235/470; 356/139; 356/375; 235/464
[58] Field of Search ............... 235/375, 376, 470, 471, 235/464; 250/568; 356/375, 139, 138; 364/460, 462

[56] References Cited

U.S. PATENT DOCUMENTS

3,705,955 12/1972 Assouline et al. .
4,662,752 5/1987 Tucker et al. ........................ 356/375

FOREIGN PATENT DOCUMENTS

0147333 8/1985 European Pat. Off. .
2186658 1/1974 France .
2433760 3/1980 France .
2143395 2/1985 United Kingdom .

OTHER PUBLICATIONS

Patents Abstracts of Japan, vol. 6, No. 192, (p. 145), 9/30/82, (JP-A-57 103 072), (Kogyo Gijutsuin).

Primary Examiner—Patrick R. Salce
Assistant Examiner—Anita M. Ault
Attorney, Agent, or Firm—Sughrue, Mion, Zinn, Macpeak, and Seas

[57] ABSTRACT

The system comprises a plurality of passive target patterns (30, 31, 32, 33) situated on a surface (24) of an object to be located, and an approach sensor (19) including: a source (20) for emitting light towards said patterns; a receiver (22) for receiving light reflected from said object (21); and a processor member (23) connected to said source (20) and said receiver (22). Each passive pattern comprises a series of optically-readable elongate symbols disposed relative to one another in such a manner as to constitute a code, with the approach sensor serving to scan said object optically. The invention is applicable to docking and stowage maneuvers between two space vehicles.

18 Claims, 5 Drawing Sheets

SYSTEM FOR LOCATING AN OBJECT PROVIDED WITH AT LEAST ONE PASSIVE TARGET PATTERN

The present invention relates to system for locating an object provided with at least one passive target pattern.

BACKGROUND OF THE INVENTION

The system includes an approach sensor. Such a sensor measures the position of an object relative to three reference axes and in a given volume, said object having one or more passive references fixed thereto. Approach sensors are used, in particular, in space, i.e. under conditions of weightlessness, when performing docking or stowage maneuvers with two space vehicles. The measurements performed generally include:
an angle measurement;
a distance measurement; and
a speed measurement.
These measurements are generally performed with an accuracy of about:
±1° for the angle measurement;
±5 mm for the distance measurement (at a range of 1 m); and
<10$^{-2}$ m/s for the speed measurement.

At the beginning of the approach stage, the object to be located must already be in a certain volume which is defined relative to the reference axes. Several types of sensor can be used to achieve the desired results:

Optical sensors:

Optical sensors may be of the imaging type or of the telemeter type.

Imaging type sensors measure the angle at which the passive reference mark on the object is seen, and also measure variation in said angle. Such sensors are thus very complex to build because of the complexity of the target patterns and also because of the difficulty associated with processing the information digitally (image analysis). Such imaging sensors appear to be more suitable for performing a portion only of the required functions.

Telemeters are based on the principle of measuring a characteristic of a light beam or pencil, with the desired measurement being deduced from the measured characteristic. Four such techniques are used:

(1) The light flux is measured as reflected from the target pattern on the object. The drawbacks of this method are its sensitivity to interfering illumination and the inability of the system to perform absolute measurements;

(2) The frequency of the light wave reflected from the pattern is measured, and deductions are made based on the Doppler effect. The drawbacks of this method include the high degree of frequency stability which is required and the fact that it can only be used to measure radial speeds;

(3) The transit time of a pulse reflected from a target on the object is measured. The major drawback of this technique is the highly complex electronics which need to be associated therewith in order to obtain a high degree of accuracy; and (4) The phase shift on an intensity modulated light beam is measured. These techniques do not give the necessary accuracy at short distances.

Microwave sensors:

Such systems are similar to radars, anti-collision systems, airport radars, etc... Various techniques can be used with microwaves. However, depending on which technique is used, one type of measurement will be facilitated relative to the others. The drawbacks of microwave systems are the bulk and the complexity of the installation and the possibility of HF interference with other equipment in the vicinity. There is also the problem of poor performance at short distances.

Preferred embodiments of the present invention provide a system for locating an object and including an approach sensor which belongs to the family of imaging sensors using special passive targets fixed on the object being approached.

SUMMARY OF THE INVENTION

The present invention provides a system for locating an object provided with passive target patterns, said system comprising an approach sensor including a source for emitting light towards each pattern, a receiver for receiving light reflected from said object, and a processor member connected to said source and to said receiver, said locating system being a system for locating an object with reference to three dimensions, said passive patterns being constituted by at least four patterns disposed on two of said dimensions, each passive pattern being situated on a surface of said object and comprising a series of optically-readable elongate symbols disposed relative to one another in such a manner as to constitute a code, and said approach sensor being capable of performing narrow beam scanning of said surface along two of said dimensions, said patterns being disposed in pairs on respective ones of said axes $\Delta i$ which are inclined relative to one another and which pass through a common point 0.

The present invention has the major advantage of using target patterns which are very easy to make, but which nevertheless include a large amount of information.

Advantageously, each of the patterns comprises a series of lines. In a preferred implementation of the invention, these pattern-constituting lines are in the form of parallel bars and they are disposed on a plane face of the object.

Such target patterns have generally been used in the past solely for recognizing objects. For example they are commonly used in supermarket checkouts, and they have the advantage of being very easy and simple to recognize and read automatically.

The invention is particularly applicable to space and satellites, and especially to manned flights, etc., in which rendez-vous, docking, or stowage maneuvers are to take place. The image sensor used for this purpose in a device in accordance with the invention, and in particular for use in conjunction with objects located only a few meters away, has the major advantage of being considerably simplified.

more precisely, the invention relates to a system for locating an object provided with four passive target patterns which are spaced as far apart as possible from one another on two perpendicular axes, with the code bars extending perpendicularly to said axes, and with the object being scanned either by sweeping a light beam across the object or else by sweeping the solid reception angle of the receiver across the object.

BRIEF DESCRIPTION OF THE DRAWINGS

Embodiments of the invention are described by way of example with reference to the accompanying drawings, in which.

MORE DETAILED DESCRIPTION

There are several extremely different bar code systems currently in use for labelling objects.

Figure 1:
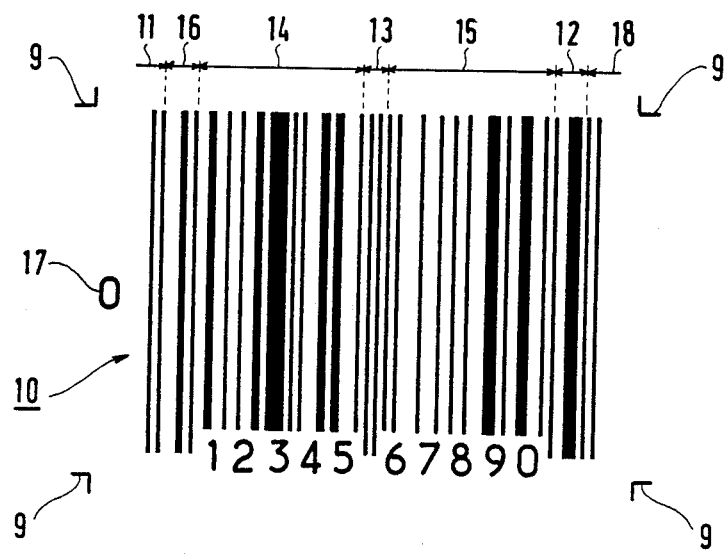
FIG. 1 shows a prior art bar code pattern.

The code 10 shown in FIG. 1 by way of example comprises a succession of thick bars and thin bars of the kind which are conventionally printed on goods sold in supermarkets.

The code 10 is delimited by two end marks 11 and 12 disposed at opposite ends of the code, together with a central delimiting mark 13. The code 10 represents twelve digits: six of the digits (reference 14) are to the left of the central delimiting mark 13, and each of them is represented by a white space, a black bar, a second space, and a second bar. The other six digits (reference 15) are to the right of the central delimiting mark 13 and each of them is represented by a bar, a space, a bar, and a space. This arrangement enables an optical reader to determine whether the code 10 has been read in the right direction or the wrong direction, and to perform the necessary inversions if the code is read in the wrong direction. The twelve digits have different meanings. The dirst decoded digit 16 (shown in the "clear" at 17 to the left of the succession of bars) is a number characteristic of the system. For example a zero corresponds to standard supermarket goods. The next five digits (referenced 14 and constituted by the digits 12345 in this case) identify the product manufacturer. The next five digits (referenced 15 and constituted by the digits 67890) identify the product itself. The last digit (reference 18) is not reproduced in the clear and is used as a check digit to verify that the other eleven code digits have been read properly. Corner marks 9 determine the area around the set of bars which must be left blank.

Bar codes, and in particular the code shown in FIG. 1, are known to the person skilled in the art of object recognition, but they are unusual in the art of locating the position of an object in a given frame of reference.

Figure 2:
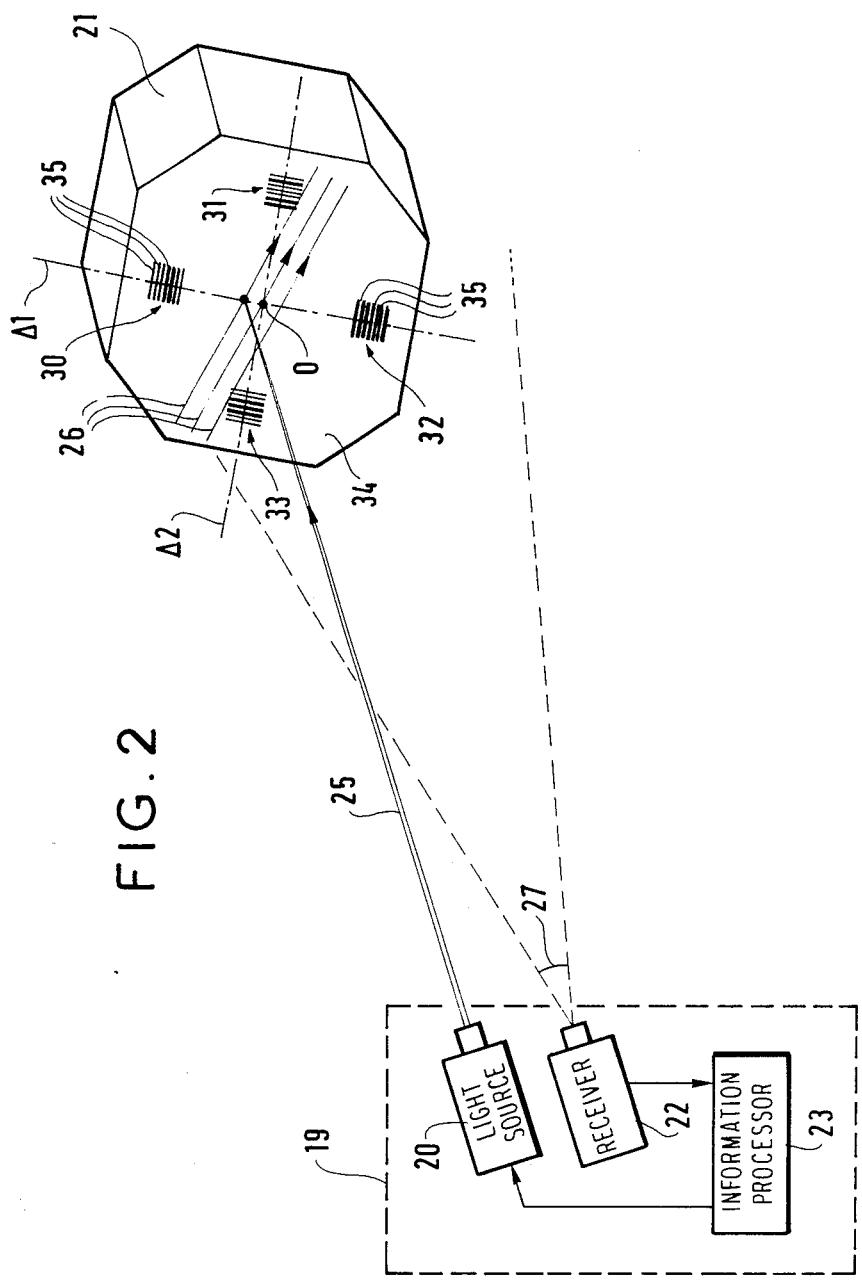
FIG. 2 is a diagram showing a locating system in accordance with the invention.

The locating system in accordance with the invention and as shown in FIG. 2 comprises: firstly and approach sensor 19 and secondly a plurality of target bar code patterns, 30, 31, 32, and 33 disposed on a plane face 34 of an object 21 whose position is to be located. The approach sensor 19 comprises the following different portions:

a light source 20 for emitting light towards the object 21 whose position is to be located;

a receiver 22 for receiving light reflected from the object 21; and an information processor member 23.

In order to locate an object relative to three axes, the object may be scanned either by scanning an emitted pencil light beam 25 or else by scanning the direction in which the receiver looks in order to seek an optical echo (a reflection) in a large volume in which the object 21 is assumed to be located initially.

FIG. 2 shows the first solution, i.e. the solution based on scanning a pencil light beam. Thus, in operation, the light source 21 emits a pencil beam 25 which scans (lines 26) the object 21 and which enables the encoded information of the various target patterns disposed on a plane face 34 of the object 21 to be read by means of the light receiver 22 which is responsive to light coming from a certain reception solid angle 27 which includes the entire object 21. The information processor member 23 responds to the coded information as detected by the light receiver 22 to locate the object 21.

The purpose of such scanning 26 is thus to find the bar codes by a simple reading operation and then to determine their position relative to reference axes. It is much easier to read bar codes than it is to analyze an image of the object.

In order to read the bar codes from an arbitrary origin position, a necessary and sufficient condition is that the bars which constitute the patterns should be at least as long as the length of said patterns at right angles to the bar direction. Advantageously, each pattern 30, 31, 32, 33 is therefore square in overall shape.

In order to locate the axes of the object 21 and thus the orientation of the object, four target patterns 30, 31, 32, and 33 are placed on the object 21 as far apart as possible from one another. The code of each pattern contains position information, e.g. north, south, east and west, together with various other identifying items, such as:

a reference identifying the object;

the nature of the arrival points; and the distance between the pattern (in order to perform corrections on measurements performed automatically).

In FIG. 2, the patterns are associated in pairs 30 & 32 and 31 & 33, and are disposed on two perpendicular axes $\Delta 1$ and $\Delta 2$ in an arrangement which is symmetrical about the point of intersection O of said axes $\Delta 1$ and $\Delta 2$. In each case, the bars of the codes associated with a particular axis extend perpendicularly to said axis.

In order to determine the relative position of the object 21 from the assembly including the source 20, the receiver 22 and the processor member 23, comparisons are performed between the directions of two sets of reference axes, one fixed relative to the objects and the other fixed relative to the approach sensor.

The angle between these directions can easily be calculated given the instants at which the bar code patterns are properly read. Various parameters can easily be obtained, and in particular:

the spacing between the scan lines;

the distance between two located patterns (and this parameter may be specifically indicated in the bar codes); and the time which elapses between two successive reads.

Figure 3:
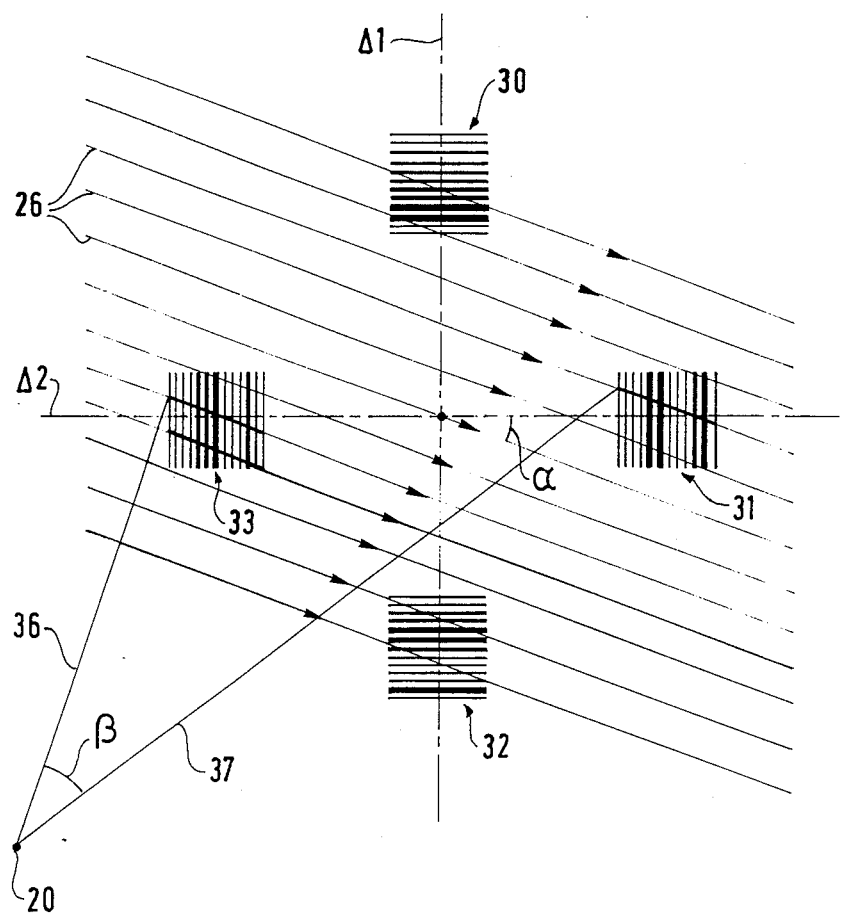
FIGS. 3 and 4 are diagrams for explaining the operation of the locating system.
Figure 4:
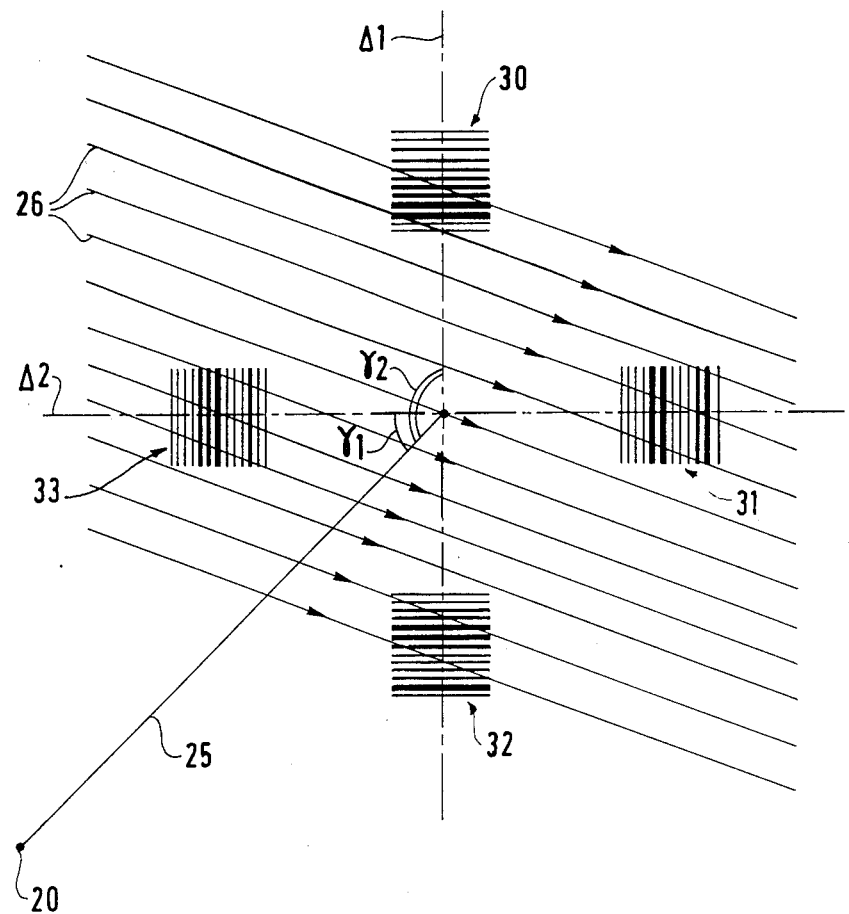

In FIGS. 3 and 4, the codes of patterns 30 and 32 are never read correctly (i.e. in full). The code of pattern 33 is read twice. The code of pattern 31 is read correctly on one occasion only, and there are three or four scan lines which separate the codes that are read in full. It is easy to establish the time which elapses between the starts of the codes of patterns 33 and 31. It is thus very easy to deduce the angle $\alpha$ between the axis $\Delta 2$ on the object and the scanning direction which may, for example, be parallel to one of the reference axes of the approach sensor.

It is also possible to deduce the angle $\beta$ seen from the source 20 between the starts of the two patterns 33 and 31 and thus to determine the distance between the source 20 and the object 21, given the distance between the patterns (which distance may be encoded in the bar codes).

The angle $\gamma_1$ may also be determined by measuring the difference between the rates at which the patterns 33 and 31 are read. In order to establish the position of the object 21 in three dimensions and not solely in a plane, an angle $\gamma_2$ is measured using scanning in a direction perpendicular to the preceding scan 26, thereby enabling the other two patterns 30 and 32 to be read in full.

A second set of patterns may be provided in order to obtain higher measuring accuracy, in particular during the final approach to the object once it has come too close for the sensor to be able to use the first set of patterns.

Figure 5:
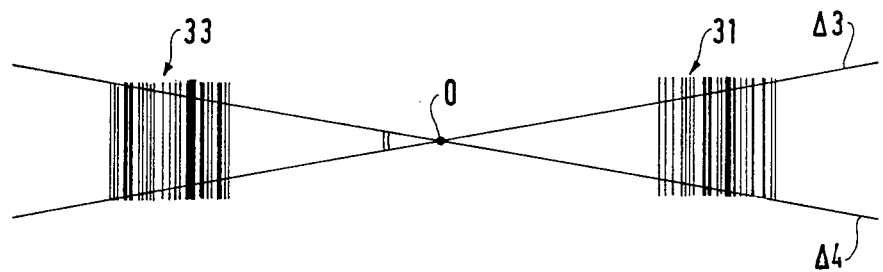
FIGS. 5, 6 and 7 illustrate various embodiments of the locating system.

In order to measure the various angles, the reference axes of the sensor may be aligned with the reference axes of the object 21. The scan directions of the first and second scans are then respectively aligned along the axes $\Delta 1$ and $\Delta 2$. As shown in FIG. 5, the first scan direction 26 must lie between two extreme directions $\Delta 3$ and $\Delta 4$ which correspond to the extreme edges of the two patterns 33 and 31.

Figure 6:
Figure 7:
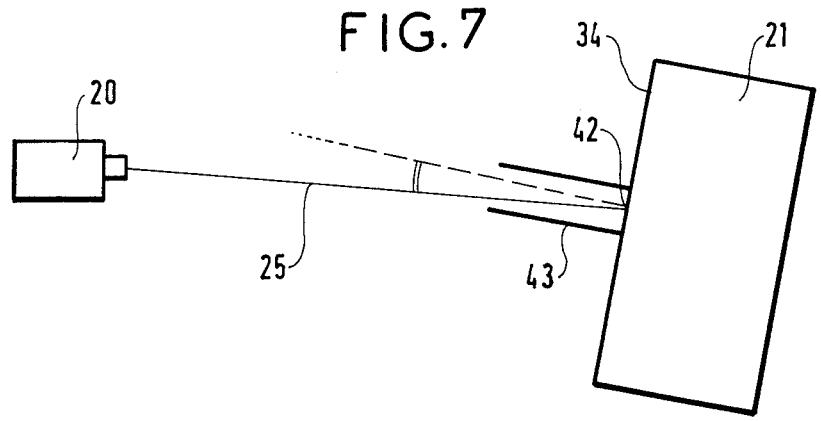

In order to improve measurement accuracy, a second set of patterns 40 and 41 may be used. The second set of patterns 40 and 41 may be a set of patterns including shorter bars, in which case the reference axex of the sensor may be aligned therewith, as shown in FIG. 6. It is also possible to measure the angles with greater accuracy by placing a pattern 42 at the bottom of a well 43, for example at the point of intersection between the axes $\Delta 1$ and $\Delta 2$ on which the main patterns 30, 31, 32, and 33 are located.

Naturally, the present invention has been described with reference to a preferred embodiment and various items could be replaced by equivalent items without going beyond the scope of the claims.

For example, the object 21 may be provided with more than four patterns, for example it might have six patterns disposed on three axes $\Delta i$ disposed at 60° to each other and intersecting at a common point 0.

The surface on which the patterns 30 to 33 are disposed is not necessarily a plane face of the object, the patterns may be attached to various different portions of the object or they may lie on a face which is not plane. If the patterns do lie on a face which is not plane, they may be formed by elongate trapezoidal symbols which need not be parallel bars.

The second set of patterns may also include four patterns disposed on the axes $\Delta 1$ and $\Delta 2$ but located closer to the point of intersection O of said axes $\Delta 1$ and $\Delta 2$ than the main patterns.

What is claimed is:

1. A system for locating an object provided with passive target patterns, said system comprising an approach sensor including a source for emitting light towards each pattern, a receiver for receiving light reflected from said object, and a processor member connected to said source and to said receiver, said locating system being a system for locating an object with reference to three dimensions, said passive patterns being constituted by at least four patterns disposed on two of said dimensions, each passive pattern being situated on a surface of said object and comprising a series of optically-readable elongate symbols disposed relative to one another in such a manner as to constitute a code, and said approach sensor being capable of performing narrow beam scanning of said surface along two of said dimensions, said patterns being disposed in pairs on respective axes $\Delta 1$ and $\Delta 2$ which are inclined relative to one another and which pass through a common point 0.

2. A locating system according to claim 1, wherein the passive patterns are situated on a plane face of the object.

3. A locating system according to claim 1, wherein each passive pattern comprises a series of lines.

4. A locating system according to claim 3, wherein each passive pattern comprises a series of parallel bars.

5. A locating system according to claim 4, wherein the bars constituting the patterns extend perpendicularly to the respective axes $\Delta 1$ and $\Delta 2$ passing through said patterns.

6. A locating system according to claim 4, wherein the bars constituting the patterns are at least as long as said patterns.

7. A locating system according to claim 4, said patterns comprise main patterns and further including at least one additional pattern having the same characteristics as the main patterns and situated on the plane face of the object on which said main patterns are situated, in such a manner as to obtain greater locating accuracy.

8. A locating system according to claim 7, wherein the bars of each additional pattern are shorter than the lengths of said patterns.

9. A locating system according to claim 7, wherein there are four additional patterns disposed on the same axes $\Delta 1$ and $\Delta 2$ as the main patterns but closer to the point of intersection O of said axes than said main patterns.

10. A locating system according to claim 7, wherein at least one additional pattern is disposed at the bottom of a well.

11. A locating system according to claim 10, wherein said additional pattern located at the bottom of a well is situated at the intersection O of the axes $\Delta 1$ and $\Delta 2$ of the main patterns.

12. A locating system according to claim 1, wherein the patterns are situated symmetrically about the point of intersection O of said axes $\Delta 1$ and $\Delta 2$.

13. A locating system according to claim 1, wherein the patterns are four in number and are respectively disposed as on pairs two the axes $\Delta 1$ and $\Delta 2$ which are perpendicular to each other.

14. A locating system according to claim 1, wherein the approach sensor is capable of scanning the object along at least two different directions.

15. A locating system according to claim 14, wherein said two scan directions are mutually perpendicular.

16. A locating system according to claim 1, wherein the approach sensor is capable of scanning the object at constant speed.

17. A locating system according to claim 1, wherein the source emits a pencil beam which scans the object.

18. A locating system according to claim 1, wherein the receiver is sensitive to light in a solid reception angle which scans the object.

* * * * *